(12) United States Patent
Cuperus et al.

(10) Patent No.: US 7,102,525 B2
(45) Date of Patent: Sep. 5, 2006

(54) READER AND TRANSPONDER IN ENCLOSURES

(75) Inventors: Johan Cuperus, Yverdon-les-Bains (CH); Peter Heimlicher, Fribourg (CH)

(73) Assignee: Optosys SA, (CH)

( * ) Notice: Subject to any disclaimer, the term of this patent is extended or adjusted under 35 U.S.C. 154(b) by 175 days.

(21) Appl. No.: 10/717,763

(22) Filed: Nov. 20, 2003

(65) Prior Publication Data

US 2004/0099744 A1 May 27, 2004

(30) Foreign Application Priority Data

Nov. 21, 2002 (EP) .................................. 02406006

(51) Int. Cl.
*G08B 13/14* (2006.01)

(52) U.S. Cl. ............................... 340/572.8; 340/572.7; 343/741

(58) Field of Classification Search ............ 340/572.1, 340/539.1, 10.3, 572.7, 572.8; 343/788
See application file for complete search history.

(56) References Cited

U.S. PATENT DOCUMENTS

| | | | |
|---|---|---|---|
| 4,857,893 A * | 8/1989 | Carroll ................ | 340/572.7 |
| 5,515,303 A * | 5/1996 | Cargin et al. ............ | 361/683 |
| 5,767,789 A * | 6/1998 | Afzali-Ardakani et al. | 340/10.1 |
| 5,864,323 A * | 1/1999 | Berthon ................ | 343/788 |
| 6,109,528 A * | 8/2000 | Kunert et al. .......... | 235/472.01 |
| 6,556,140 B1 * | 4/2003 | East .................. | 340/572.8 |
| 2004/0113790 A1 * | 6/2004 | Hamel et al. .......... | 340/572.1 |
| 2005/0007296 A1 * | 1/2005 | Endo et al. ............ | 343/895 |
| 2005/0040997 A1 * | 2/2005 | Akiho et al. ........... | 343/866 |

FOREIGN PATENT DOCUMENTS

| | | |
|---|---|---|
| DE | 197 55 893 A1 | 6/1999 |
| DE | 198 07 284 A1 | 9/1999 |
| EP | 0 782 214 A1 | 2/1997 |
| EP | 1 288 016 A1 | 5/2003 |
| WO | WO 00/21031 A1 | 4/2000 |
| WO | WO 02/055315 A1 | 7/2002 |

OTHER PUBLICATIONS

Klaus Finkenzeller, RFID Handbook—Radio Frequency Indentification Fundamentals and Applications, 1998, John Wiley & Sons Ltd, pp. 66.*
Copy of European Search Report dated Apr. 25, 2003.

* cited by examiner

*Primary Examiner*—Jeffery Hofsass
*Assistant Examiner*—Hoi C. Lau
(74) *Attorney, Agent, or Firm*—Ostrolenk, Faber, Gerb & Soffen, LLP

(57) ABSTRACT

The antenna and the electronic control circuit of the transponder are contained in a totally hermetical metallic enclosure. The antenna of the reader is protected from the environment by a metallic front plate that is integral with the enclosure containing the electronic control circuit. In a preferred embodiment, the enclosure is hermetically tight. These embodiments fulfill the longstanding need to obtain completely tight elements that are resistant to industrial aggressions.

7 Claims, 1 Drawing Sheet

READER AND TRANSPONDER IN ENCLOSURES

FIELD OF THE INVENTION

The present invention refers to a transponder with an antenna and an electronic control circuit and comprising a metallic enclosure, and to a reader with an antenna and comprising an enclosure.

BACKGROUND OF THE INVENTION

The developments in automation require the identification of products, of tools, and of operations such as manufacture, packaging, and storage. The very well-known barcode systems suffer from numerous drawbacks. Thus, the physical or chemical deterioration of the labels may be mentioned, as well as the printing or engraving of the barcode on the part to be identified, which is often impossible because of the quality and the color of the material. On the other hand, the visual analysis of the barcode does not allow the presence of liquids or of oil films on the barcode, which is very often the case in industrial environments.

The Radiofrequency Identification system (RFID) constitutes a new solution that offers numerous advantages. The transponder is a passive tag that captures the energy of the magnetic field emitted by the reader. The transponder is thereby enabled to communicate information contained in its memory to the reader. In certain cases, it is capable of modifying this information on demand of the reader. This new ability is an important advantage over the other identification systems.

PRIOR ART

The transponder is generally enclosed in an insulating material so as not to hinder magnetic induction. One difficulty is in the attachment or the incorporation of the transponders to or in the products to be identified. If applied to metallic objects, the operation of the transponders will be disturbed and their sensitivity will be reduced.

Manufacturers have attempted to overcome these difficulties and to realize transponders that are operative in the vicinity of metallic elements and resistant to industrial aggressions. Known are elements packaged in a metallic envelope that is not completely closed, thereby allowing the propagation of the magnetic field towards the transponder. Thus, an opening is provided by a thin gap or a junction of two surfaces of sufficient rugosity. Unfortunately, these locations become points of potential leakage in transponders that have to operate in aggressive environments. Also, a sufficient cleaning cannot be ensured in the case of equipment intended for the production or the packaging of foods or drugs.

Readers comprising a metallic protection of the antenna coil are not currently known. Therefore, the plastic cap may offer an insufficient protection against aggressive agents. The bonding interstices of this cap may crack and be contaminated; it is therefore impossible to ensure an efficient cleaning.

SUMMARY OF THE INVENTION

It is a first object of the present invention to realize a transponder contained in a hermetical metallic enclosure and a second object of the present invention to realize a reader whose antenna cap and enclosure are metallic and according to a preferred embodiment consist of a single metallic piece offering optimum protection while providing operating performances that are comparable to products currently available on the market.

These objects are attained by a transponder wherein the antenna and the electronic control circuit are contained in a hermetical metallic enclosure and by a reader wherein the antenna is protected from the environment by a metallic front plate that is integral with the enclosure containing the electronic control circuit.

BRIEF DESCRIPTION OF THE DRAWINGS

The invention will be explained with reference to the accompanying drawings of an embodiment thereof.

DETAILED DESCRIPTION OF THE INVENTION

Figure 1:
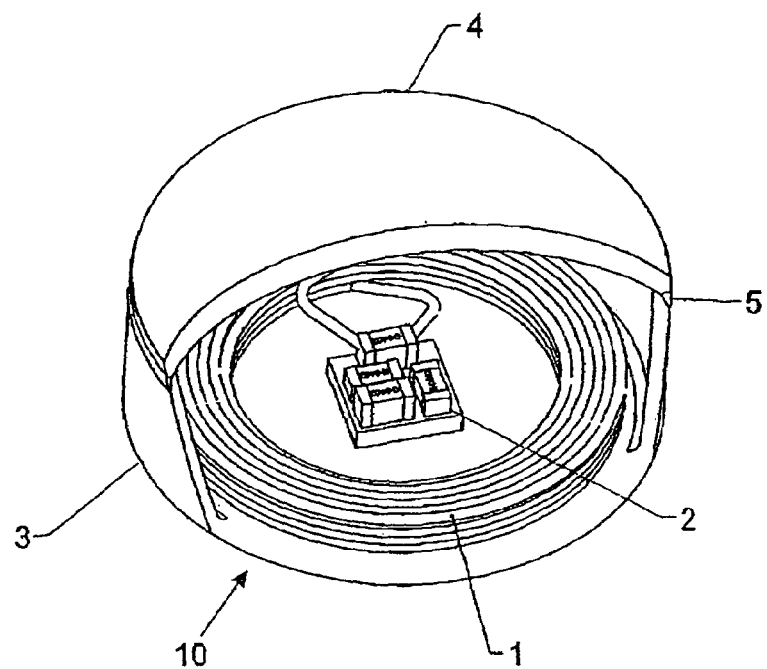
FIG. 1 represents a transponder packaged in a metallic enclosure that is closed by a welded lid.

The transponder 10 shown in a partial cross-section in FIG. 1 consists of a coil 1 associated to a non-represented capacitor and resistor to form a resonant antenna, as well as of an electronic chip 2 comprising a powerful communication controller and a reprogrammable memory. These elements are assembled in a metallic enclosure 3 closed by a lid 4, which may e.g. be welded, and whose welding seam 5 is visible.

Figure 2:
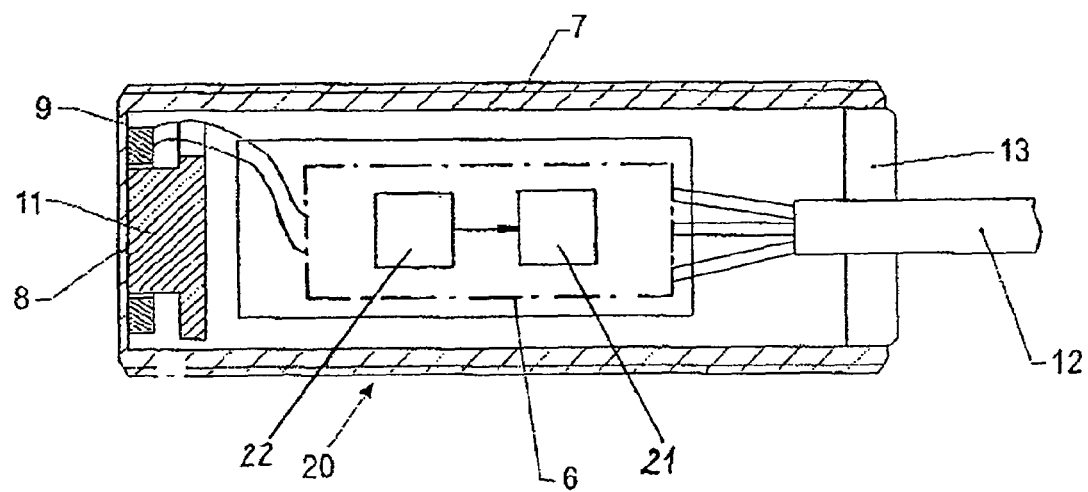
FIG. 2 shows a reader whose antenna and communication circuits are protected by a metallic sleeve.

Reader 20 represented in a sectional view in FIG. 2 comprises, in a cylindrical metallic sleeve 7 having a relatively thin metallic wall 8, a coil 9 associated with a non-represented capacitor and resistor to form the antenna circuit. A highly permeable ferrite element 11 influences the shape of the magnetic field and favors radiation towards the front of the reader through the front plate of the metallic wall 8 of the enclosure. Electronic circuit 6, that includes a reception circuit 21 and a differentiating filter 22, with electric cable 12 that is tightly guided through plug 13 of the enclosure realizes the different functions of the reader, i.e.:

Generation of the carrier wave and modulation of the latter with the control information intended for the transponder.

Filtering and processing of the signal generated by the transponder.

Management of the dialog with the transponder and of the communication with the user through a serial interface.

In order to attain the objects of this invention, important parameters and elements as well as the electronic circuits of the transponder and of the reader had to be optimized. The choice of the frequency must take into account the penetration depth of the magnetic radiation in the two metallic walls which absorb a part of the energy and in turn behave as a secondary antenna. Depending on the frequency, the radiation of this secondary antenna interferes with the primary radiation and leads to distortions and important variations of the detected signal.

The mechanical and electric characteristics of the material of these metallic walls are very important. The wall has to provide a good mechanical protection, a high resistance to solvents and must not oxidate. In order to allow a sufficient penetration depth, the electric resistivity of this material must not be too low, and the latter must not be magnetic.

In the case of RFID applications that are subject to the constraints of industrial environments, it appears that stainless steel offers the most interesting performance, but the invention is not limited to this material. If a different material such as precious metal or Anticorrodal is desired, an adaptation of the means of this invention is possible. In this exemplifying embodiment, stainless steel according to DIN 1.4305 or AISI 303 has been chosen, and the optimizations are based on the characteristics of this material.

Thus, in order to obtain an efficient signal transmission with minimum interference through walls of stainless steel of e.g. 0.2 to 0.5 mm, the frequency of the carrier wave has been chosen within a range of 20 to 50 kHz. It is understood that a different material and a different thickness of the walls may require different frequencies of the carrier wave.

The shape of the antenna coils also influences the intensity of the radiation through metallic walls. This radiation is maximum when the contact surface of the windings on the wall is maximum. Therefore, the winding has been given a rectangular shape in cross-section to allow a maximum coupling of its flank with the wall. The optimization of the radiation has also shown that an air gap, not shown, had to be provided at the rear of the coil.

Together with a capacitor, this coil forms a resonant antenna. The resonance frequency and the Q factor of this circuit are also determining for a reduced sensitivity of the antenna to surrounding metallic elements. To control the Q factor, a resistance of a convenient value is chosen for the coil of this resonant antenna circuit. For example, in the case of the transponder, this resistance is comprised between 1000 and 3000 Ohms for a coil of approx. 50 mH, while in the case of the reader, the optimum value is comprised between 100 and 300 Ohms for a coil of approx. 3 mH.

The resonance frequency of this antenna is not tuned to the frequency of the carrier wave. A better extraction of the modulated signals is obtained when this resonance frequency is 5 to 20% higher than the carrier.

The filtering circuit ensures a shaping of the modulation signal generated by the transponder. This signal is strongly attenuated due to its passage through two metallic walls. Its amplitude varies strongly in function of the distance between the transponder and the reader. A signal shaping with differentiation allows a reliable operation of the detector with large variations of the signals, thereby allowing to restore the modulation signal in spite of interference and saturation distortions on the carrier.

We claim:

1. Reader with an antenna and an electronic control circuit and comprising a metallic enclosure with a metallic sleeve, the sleeve being closed on a side proximate to the antenna by a metallic front plate, the plate being integral with the sleeve and protects the antenna from the environment, so that the control circuit can communicate, via said antenna, only through at least one of the metallic front plate and metallic wall of the sleeve of the enclosure.

2. Reader according to claim 1, wherein said enclosure comprises a hermetical closure.

3. Reader according to claim 1, wherein the electronic control circuit includes a reception circuit and a differentiating filter, the reception circuit being preceded by the differentiating filter.

4. Reader according to claim 1, wherein the enclosure is made of stainless steel with a wall thickness between 0.2 and 0.5 mm and the frequency of the carrier wave is comprised between 20 and 50 kHz.

5. Reader according to claim 1, wherein the antenna has coils which are rectangular in cross-section with the large side of the coil closely coupled to the metallic wall of the enclosure.

6. Reader according to claim 1, wherein the resonance frequency of the antenna is 5 to 20% higher than that of the carrier.

7. Reader according to claim 1, wherein the Q factor of the antenna which is resonant is degraded in a controlled manner by a resistance.

* * * * *